(12) United States Patent
Chang et al.

(10) Patent No.: US 7,199,645 B2
(45) Date of Patent: Apr. 3, 2007

(54) CIRCUIT OF VOLTAGE MULTIPLIER WITH PROGRAMMABLE OUTPUT

(75) Inventors: Yucheng Chang, Taichung (TW); Ching-Huo Huang, Hsinchu (TW)

(73) Assignee: Sitronix Technology Corp., Hsinchu Hsien (TW)

( * ) Notice: Subject to any disclaimer, the term of this patent is extended or adjusted under 35 U.S.C. 154(b) by 27 days.

(21) Appl. No.: 11/133,194

(22) Filed: May 20, 2005

(65) Prior Publication Data
US 2006/0261881 A1    Nov. 23, 2006

(51) Int. Cl.
*H03L 5/00*     (2006.01)
*G05F 1/10*     (2006.01)

(52) U.S. Cl. .................. 327/538; 327/541; 365/189.09

(58) Field of Classification Search ........ 327/538–543, 327/589, 390; 365/226, 227, 189.09
See application file for complete search history.

(56) References Cited

U.S. PATENT DOCUMENTS

| | | | | |
|---|---|---|---|---|
| 5,444,412 A | * | 8/1995 | Kowalski | 327/541 |
| 6,011,724 A | * | 1/2000 | Brigati et al. | 365/185.29 |
| 6,141,262 A | * | 10/2000 | Sudo | 365/189.09 |
| 2006/0012354 A1 | * | 1/2006 | Nunokawa et al. | 323/273 |

* cited by examiner

*Primary Examiner*—Dinh T. Le
(74) *Attorney, Agent, or Firm*—Birch, Stewart, Kolasch & Birch, LLP

(57) ABSTRACT

The circuit of voltage multiplier with programmable output, which compares the feedback voltage of the output with a reference voltage, whether the pumping circuit functions to pump the output voltage or not is controlled by a clock generator so as to sustain the output voltage within a prescribed range, moreover, by using a voltage regulator to supply a stable output voltage to the load.

4 Claims, 7 Drawing Sheets

CIRCUIT OF VOLTAGE MULTIPLIER WITH PROGRAMMABLE OUTPUT

FIELD OF THE INVENTION

The present invention relates to a circuit of voltage multiplier, especially for a circuit of voltage multiplier with low-power-consumption and programmable output.

BACKGROUND OF THE INVENTION

DC power is the most frequently used voltage source for electronic equipments. For the use of electronic equipments with different driving voltages, a DC-DC converter usually will be used to change the magnitude of a voltage. Please refer to FIG. 1, which is a well-known DC-DC voltage converter. It is composed of a bandgap 1, a pumping CKT 2, and a regulator 3. A user can choose the properties of the components according to the required supply voltage. Assume that the user needs a 7.2v output voltage Vout and a 2.4~3.6 system voltage Vcc, who may choose a 1.2v bandgap 1 and a six-times pumping CKT 2. The system voltage Vcc is first dropped to 1.2v by the bandgap 1, then is pumped to the 7.2v output voltage by the six-times pumping CKT 2, finally is regulated by the regulator 3 to supply the regulated 7.2v output voltage Vout. If customers do not mind the slight variation of the voltage, the regulator 3 can be not used.

The aforementioned voltage converter, which is dropped by the bandgap 1 and then pumped by the multiple pumping CKT 2 such that the power consumption is quite serious. Therefore, please refer to FIG. 2, an operation method that directly uses the system voltage Vcc to be the source voltage of the pumping CKT 2 has been developed recently. Similarly assume that the user needs a 7.2v output voltage Vout and a 2.4~3.6 system voltage Vcc, who only needs a triple pumping CKT 2, then regulated by the regulator 3 to supply a regulated 7.2v output voltage Vout. As a result, the operation efficiency for the pumping CKT 2 can be improved and the total power consumption is reduced.

In case the working voltage for the system voltage Vcc has a wider range whereas the operation method that directly uses the system voltage Vcc to be the source voltage of the pumping CKT 2 has to be adopted. For example, assume that a 5.0v output voltage Vout is needed whereas the system voltage Vcc is 2.0v~3.6v, uses double pumping CKT 2 when the system voltage Vcc=3.0~3.6v; uses triple pumping CKT 2 when the system voltage Vcc=2.0~2.5v; when the system voltage Vcc=2.5~3.0v then the multiple for the pumping CKT 2 should be switched between double and triple. Moreover, by way of the regulator 3 to drop and regulate the output voltage Vout can be regulated at 5.0v. Although this operation method can be applied on the case of wider system voltage Vcc, but when the system voltage Vcc=2.5~3.0v then the multiple for the pumping CKT 2 will switch between double and triple, which substantially affects the voltage-converting efficiency.

Obviously, the aforementioned DC-DC voltage converter can supply voltage in accordance with the user's requirements. However, voltage-drop is unavoidable during the process of the voltage converting so as to supply the required voltage to the load, which leads to the unnecessary power consumption.

SUMMARY OF THE INVENTION

Consequently, the main purpose of the current invention is to provide a circuit of voltage multiplier with low-power-consumption. The second purpose of the current invention is to provide a circuit of voltage multiplier with programmable output.

The present invention is a circuit of voltage multiplier with programmable output, which is composed of a pumping CKT, a CLK generator, and a comparator. The pumping CKT has an input terminal, a control terminal, and an output terminal. The CLK generator connects to the control terminal of the pumping CKT. The clock single is generated to control the operation of the pumping CKT such that the pumping CKT pumps the input voltage at the input terminal to be the output voltage at the output terminal of the pumping CKT. The comparator has two input terminals and one output terminal. The output terminal of the comparator connects to the CLK generator. One of the input terminals of the comparator connects to the output terminal of the pumping CKT, and the other input terminal of the comparator connects to a reference voltage. According to this, when the output voltage at the output terminal of the pumping CKT is lower than the reference voltage, the CLK generator is activated by the comparator to drive the pumping CKT to pump until the output voltage at the output terminal of the pumping CKT is higher than the reference voltage. At this time, the CLK generator shuts down by way of the comparator. Therefore, the output voltage at the output terminal of the pumping CKT can be controlled to supply the load merely by programming the reference voltage.

Besides, for avoiding the efficiency loss and the life reduction resulted from the pumping CKT too frequently switching, the feedback voltage derived from the output terminal of the pumping CKT can be divided into the first feedback signal and the second feedback signal by a voltage divider circuit. With the help of a multiplexer, the two feedback signals connect to the comparator at the same time. According to this, when the first feedback signal is lower than the reference voltage, the CLK generator is activated by the comparator to drive the pumping CKT to pump until the second feedback voltage is higher than the reference voltage. At this time, the CLK generator shuts down by way of the comparator. Consequently, the switching rate of the pumping CKT can be reduced.

BRIEF DESCRIPTION FOR THE DRAWINGS

DESCRIPTION OF THE PREFERRED EMBODIMENT

The detailed descriptions for content and technology of this invention associated with figures are as follows.

Figure 1:
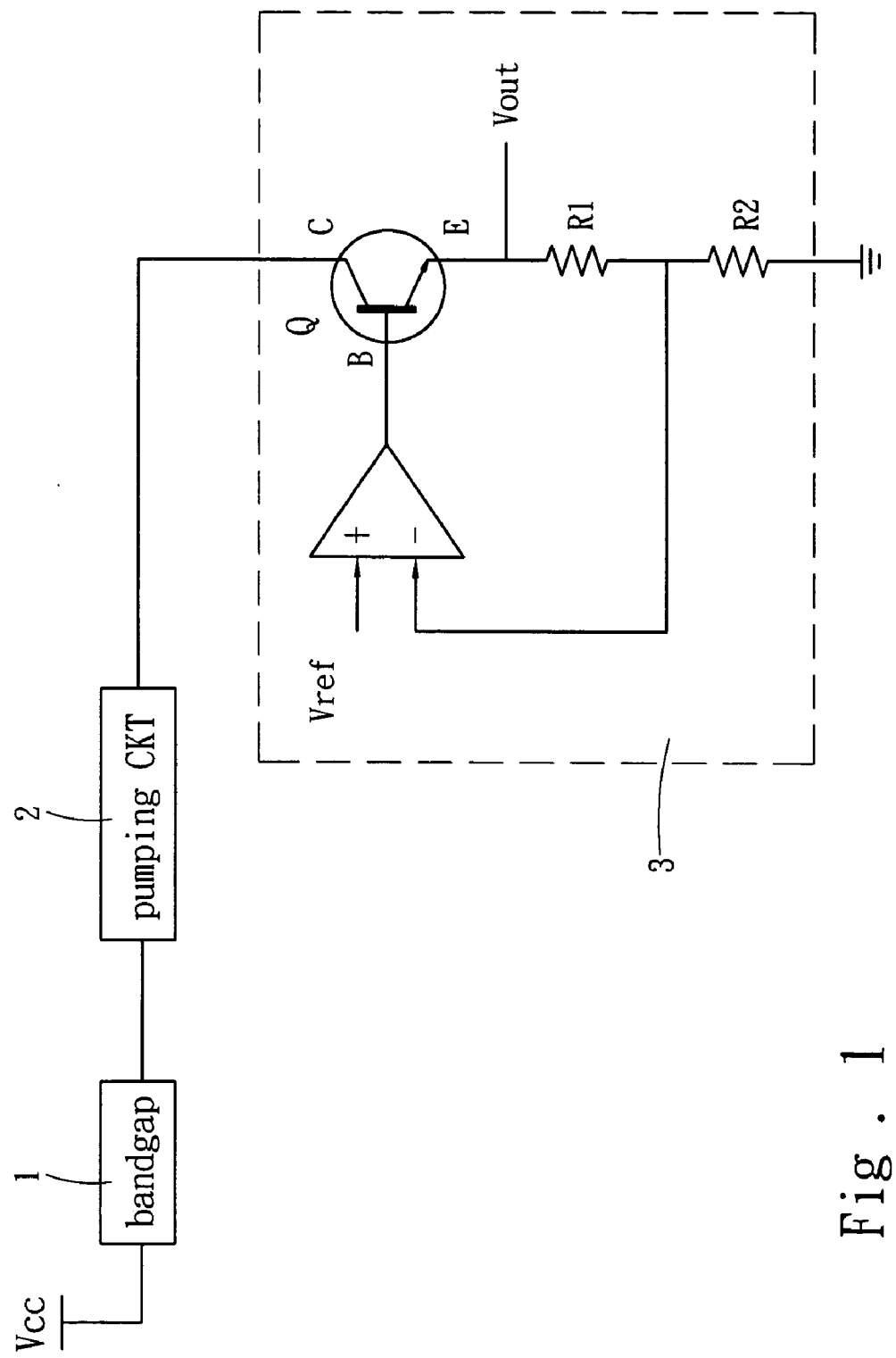
FIG. 1 is the block diagram for a well-known DC-DC voltage converter.
Figure 2:
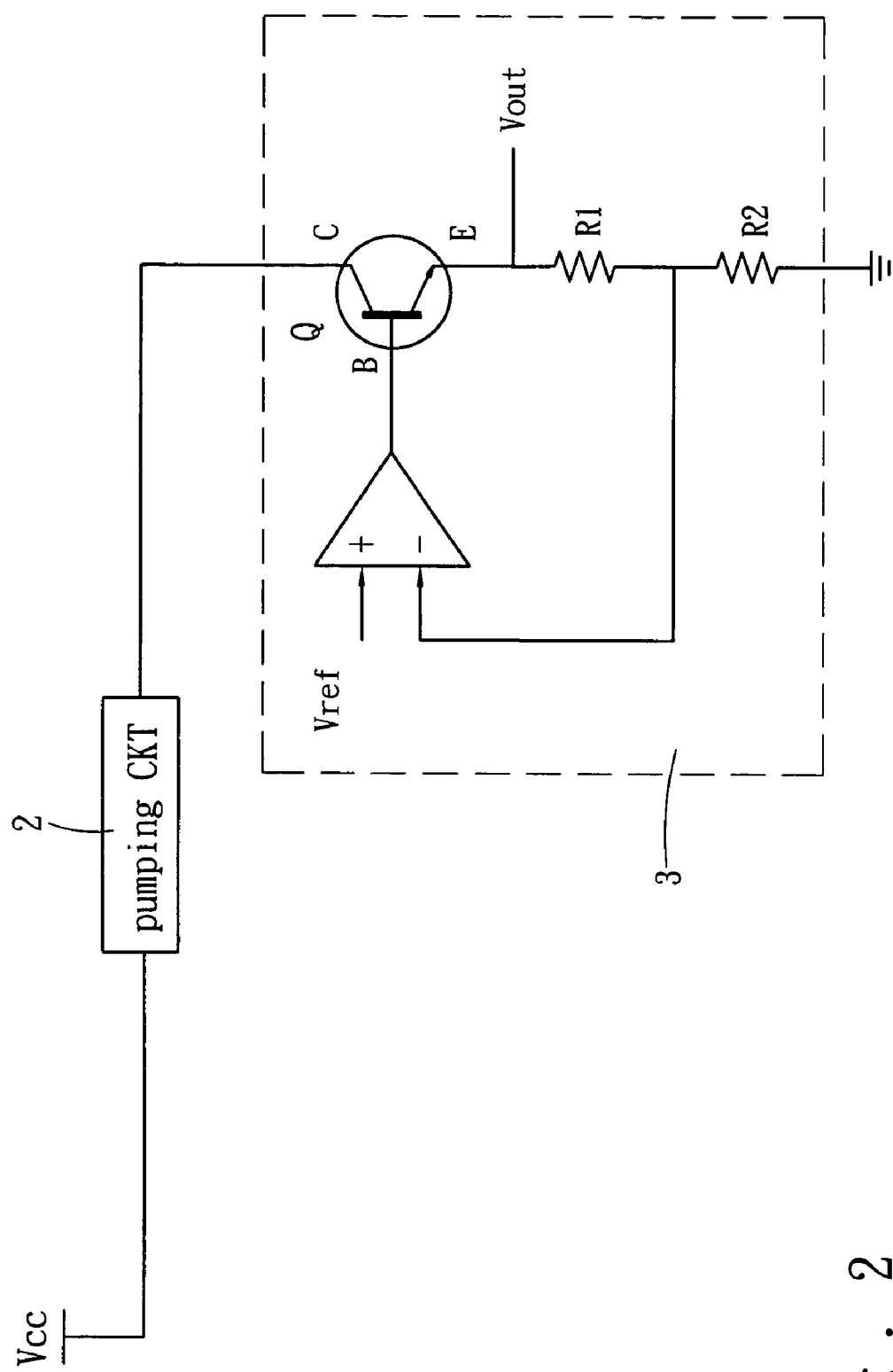
FIG. 2 is the block diagram for another well-known DC-DC voltage converter.
Figure 3:
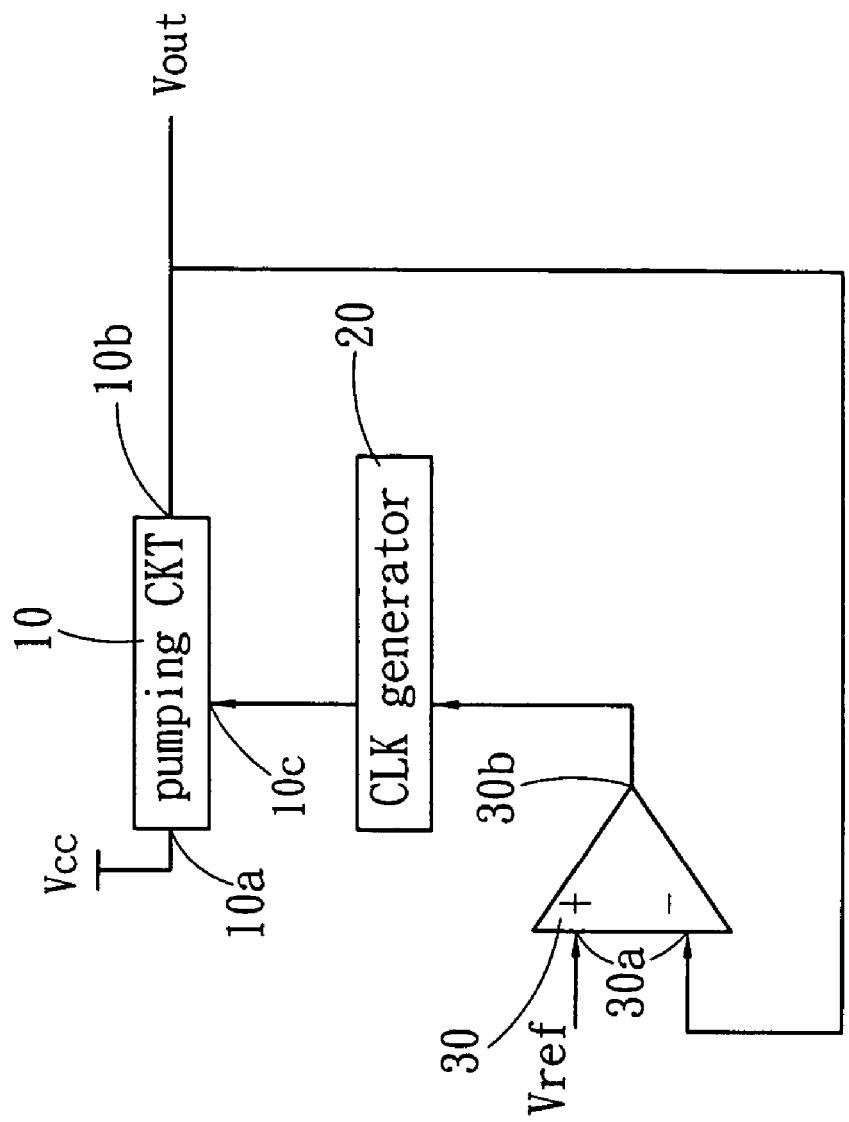
FIG. 3 is the block diagram for the DC-DC voltage converter of the first embodiment of the present invention.

Please refer to FIG. 3, which is the first embodiment of the present invention. The multiple circuit of this invention is composed of a pumping CKT 10, a CLK generator 20, and a comparator 30.

The pumping CKT 10 has an input terminal 10a, a control terminal 10c, and an output terminal 10b.

The CLK generator 20 connects to the control terminal 10c of the pumping CKT 10, and the clock signal generated by the CLK generator 20 controls the pumping CKT 10 to start or stop. The pumping CKT 10 pumps the input voltage Vcc at the input terminal 10a of the pumping CKT 10 to be the output voltage Vout at the output terminal 10b of the pumping CKT 10.

The comparator 30 has two input terminals 30a and one output terminal 30b. The output terminal 30b of the comparator 30 connects to the CLK generator 20. One of the input terminals 30a of the comparator 30 connects to the output terminal 10b of the pumping CKT 10, and the other input terminal 30a of the comparator 30 connects to a reference voltage Vref.

When the circuit starts, the CLK generator 20 will drive the pumping CKT 10 to pump the output voltage Vout at the output terminal 10b of the pumping CKT 10 continuously. The output voltage Vout at the output terminal 10b of the pumping CKT 10 will feedback to the comparator 30 continuously until the output voltage Vout at the output terminal 10b of the pumping CKT 10 is higher than the reference voltage Vref. The CLK generator 20 is turned off by way of the signals generated by the comparator 30 so as to stop driving the pumping of the pumping CKT 10. At this time, the output voltage Vout at the output terminal 10b of the pumping CKT 10 will keep dropping due to the consumption of a load (which is not shown in the figure) until the output voltage Vout at the output terminal 10b of the pumping CKT 10 is lower than the reference voltage Vref. The CLK generator 20 is turned on by way of the signals generated by the comparator 30 so as to drive the pumping of the pumping CKT 10. Accordingly, a recurring operation loop is formed. Therefore, the output voltage Vout at the output terminal 10b of the pumping CKT 10 can be controlled to supply the load (which is not shown in the figure) merely by programming the reference voltage Vref.

Figure 4:
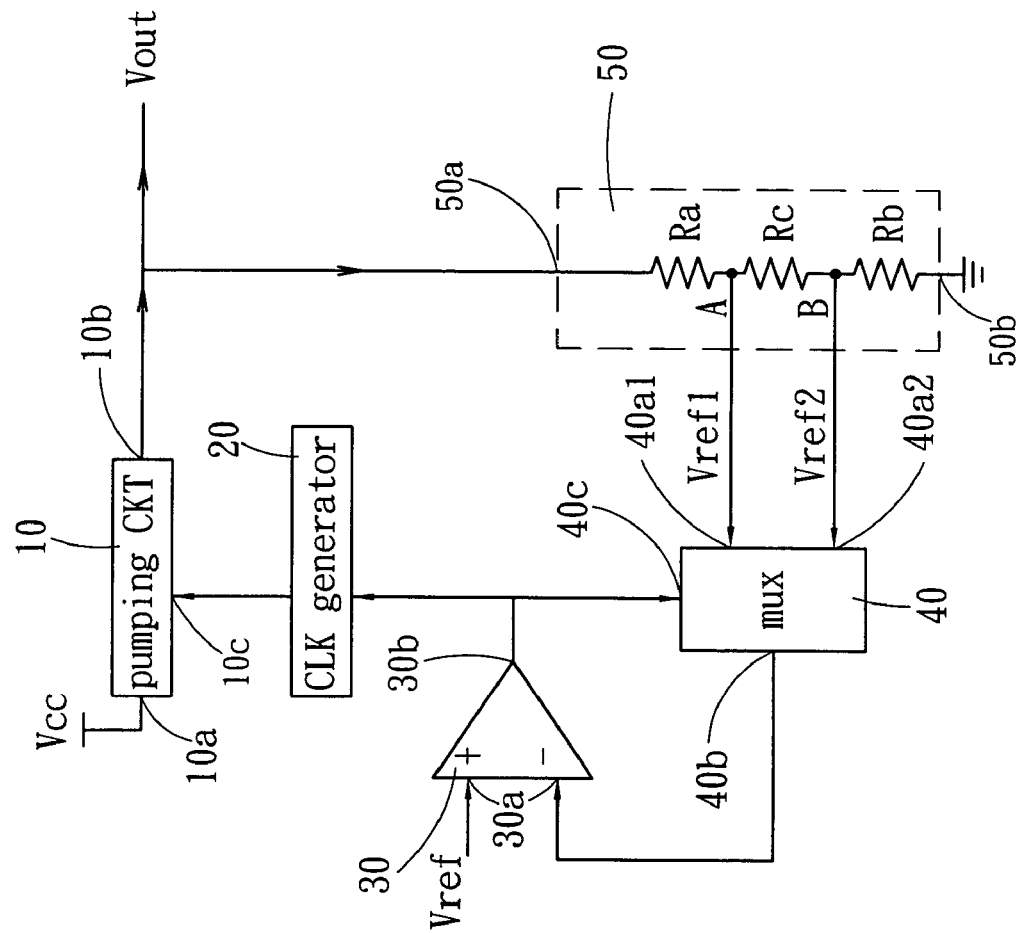
FIG. 4 is the block diagram for the DC-DC voltage converter of the second embodiment of the present invention.

Please refer to FIG. 4, which shows the second embodiment of this invention. The multiple circuit of this invention is composed of a pumping CKT 10, a CLK generator 20, a comparator 30, and a voltage divider 50.

The CLK generator 20 connects to the control terminal 10c of the pumping CKT 10, and the clock signal generated by the CLK generator 20 controls the pumping CKT 10 to start or stop. The pumping CKT 10 pumps the input voltage Vcc at the input terminal 10a of the pumping CKT 10 to be the output voltage Vout at the output terminal 10b of the pumping CKT 10.

The pumping CKT 10 has an input terminal 10a, a control terminal 10c, and an output terminal 10b.

The CLK generator 20 connects to the control terminal 10c of the pumping CKT 10, and the discontinuous clock single generated by the CLK generator 20 controls the pumping CKT 10 to start or stop. The pumping CKT 10 pumps the input voltage Vcc at the input terminal 10a of the pumping CKT 10 to be the output voltage Vout at the output terminal 10b of the pumping CKT 10.

The comparator 30 has two input terminals 30a and one output terminal 30b. The output terminal 30b of the comparator 30 connects to the CLK generator 20. One of the input terminals 30a of the comparator 30 connects to the reference voltage Vref.

The multiplexer 40 has an output terminal 40b, a selected terminal 40c, a first input terminal 40a1, and a second input terminal 40a2. The output terminal 40b of the multiplexer 40 connects to the other input terminal 30a of the comparator 30. The selected terminal 40c of the multiplexer 40 connects to the output terminal 30b of the comparator 30.

The voltage divider has an input terminal 50a and an output terminal 50b. There are a first resistor Ra, a first connection point A, a third resistor Rc, a second connection point B, and a second resistor Rb in series between the input terminal 50a and the output terminal 50b. The input terminal 50a of the voltage divider 50 connects to the output terminal 10b of the pumping CKT 10, the first connection point A connects to the first input terminal 40a1 of the multiplexer 40, the second connection point B connects to the second input terminal 40a2, and the output terminal 50b of the voltage divider is grounded.

Figure 5:
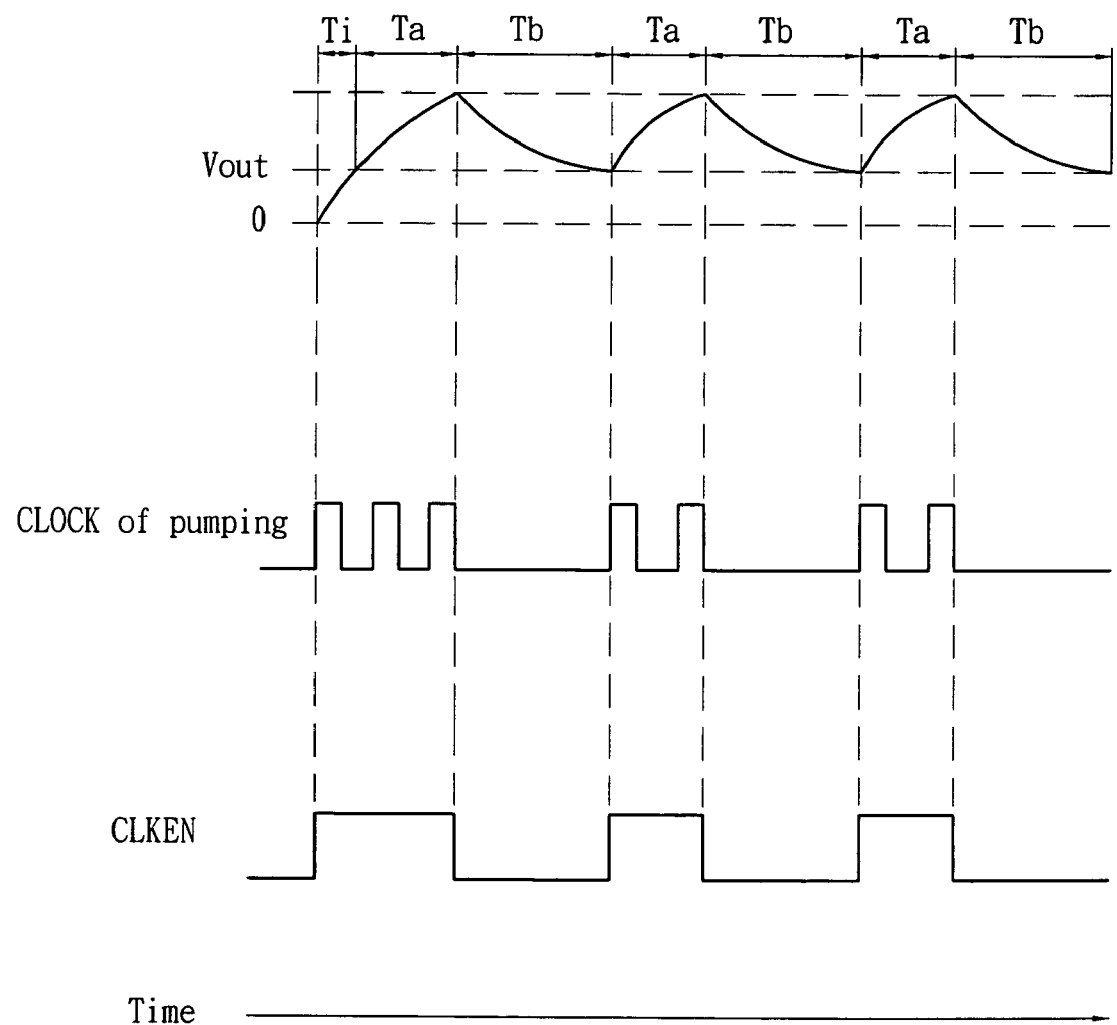
FIG. 5 is the timing diagram for the second embodiment of the present invention.

Please refer to FIG. 5, which is a timing diagram for the output voltage Vout at the output terminal 10b of the pumping CKT 10, for the pumping CKT, and for the CLK generator 20 of this invention. As shown in the figure, the time interval can be divided into Ti interval (initial interval), Ta interval, and Tb interval. In the beginning, there are Ti interval and Ta interval. When the circuit is started, the CLK generator 20 will drive the pumping CKT to pump continuously so as to increase the output voltage Vout at the output terminal 10b of the pumping CKT 10. Through the voltage divider 50, the output voltage Vout at the output terminal 10b produces the first feedback voltage Vref1 at the first connection point A and the second feedback voltage Vref2 at the second connection point B. The relations among the first feedback voltage Vref1, the second feedback voltage Vref2, the output voltage Vout at the output terminal 10b, the first resistor Ra, the second resistor Rb, and the third resistor Rc are:

$$V_{ref1} = V_{out}\left(\frac{R_b + R_c}{R_a + R_b + R_c}\right)$$

$$V_{ref2} = V_{out}\left(\frac{R_b}{R_a + R_b + R_c}\right)$$

In the beginning, the multiplexer selects the second input terminal 40a2 as the channel so that the second feedback voltage Vref2 can continuously feedback to the comparator 30 until the second feedback voltage Vref2 is higher than the reference voltage Vref. The CLK generator 20 is now turned off by way of the signals generated by the comparator 30 so as to stop the function of the pumping CKT 10. At the same time, the comparator 30 produces signals to change the channel of the multiplexer 40 to the first input terminal 40a1. At this time, the signal for the input terminal 30a of the comparator 30 changes to the first feedback voltage Vref1. However, because the second feedback voltage Vref2 is smaller than the first feedback voltage Vref1 now, when the multiplexer 40 chooses the first input terminal 40a1 to be the channel, it will not change the state of the comparator 30 to produce clock signal.

The next is the Tb interval. As time passes by, the output voltage Vout at the output terminal 10b of the pumping CKT 10 will keep dropping due to the consumption of a load (which is not shown in the figure). Correspondingly, the first feedback voltage Vref1 will also keep dropping until the first feedback voltage Vref1 is lower than the reference voltage Vref. The CLK generator 20 is now turned on by way of the signals generated by the comparator 30 so as to drive the pumping of the pumping CKT 10, and the multiplexer 40 changes to choose the second input terminal 40a2 to be the channel. Similarly, because the second feedback voltage Vref2 is smaller than the first feedback voltage Vref1 now, when the multiplexer 40 chooses the second input terminal 40a2 to be the channel, it will not change the state of the comparator 30. As describe above, intervals Ta and Th will repeat uninterruptedly to form a recurring operation-such that the output voltage Vout at the output terminal of the pumping CKT 10 keeps within the interval of $$\left(\frac{R_a + R_b + R_C}{R_b + R_C}\right) V_{ref} \leq V_{OUT} \leq \left(\frac{R_a + R_b + R_c}{R_b}\right) V_{ref}$$

Therefore, the output voltage Vout at the output terminal 10b of the pumping CKT 10 can be controlled to supply the load (which is not shown in the figure) merely by programming the reference voltage Vref, the first resistor Ra, the second resistor Rb, or the third resistor Rc.

Figure 6:
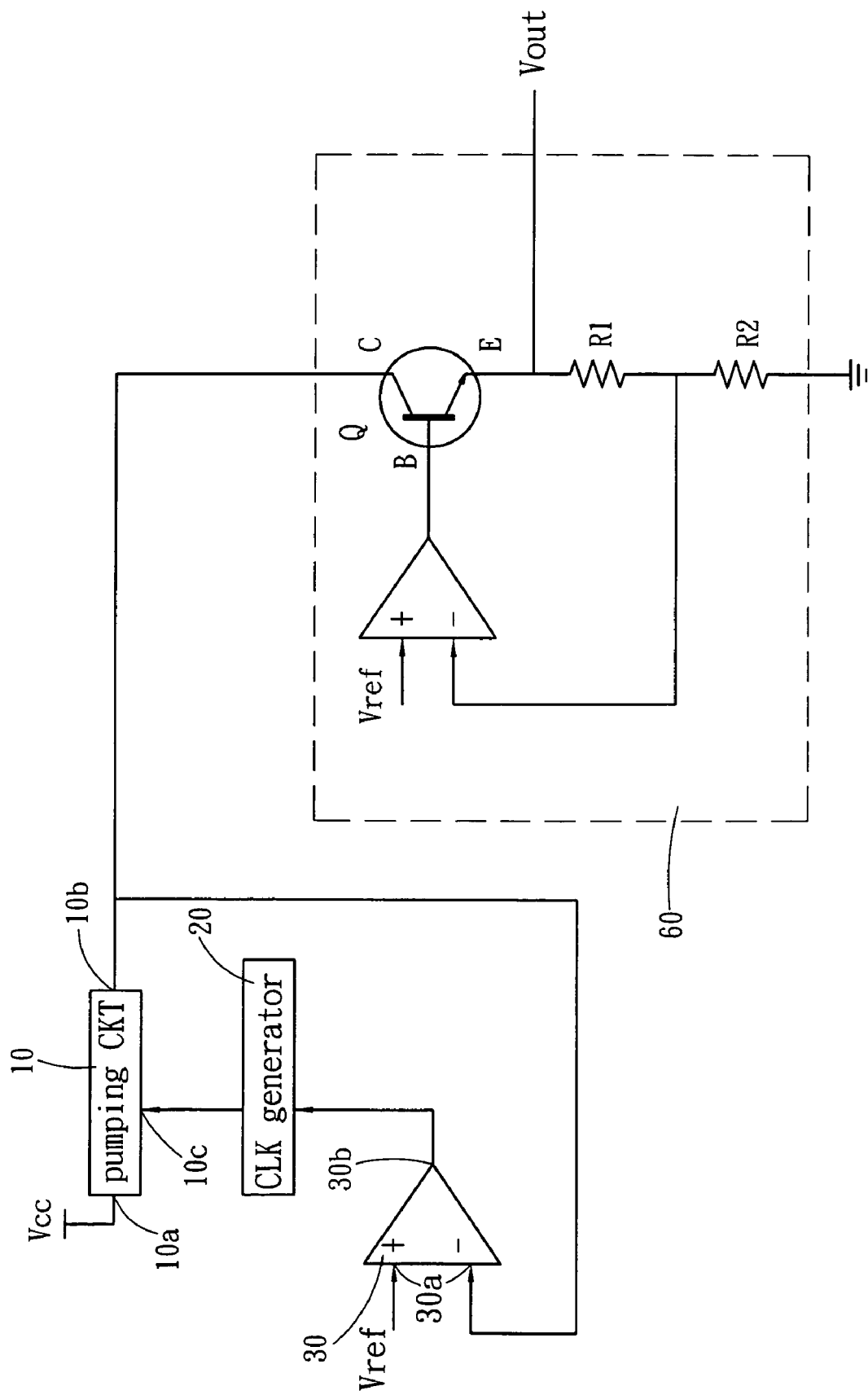
FIG. 6 is the block diagram for the first embodiment of the present invention with the regulator.
Figure 7:
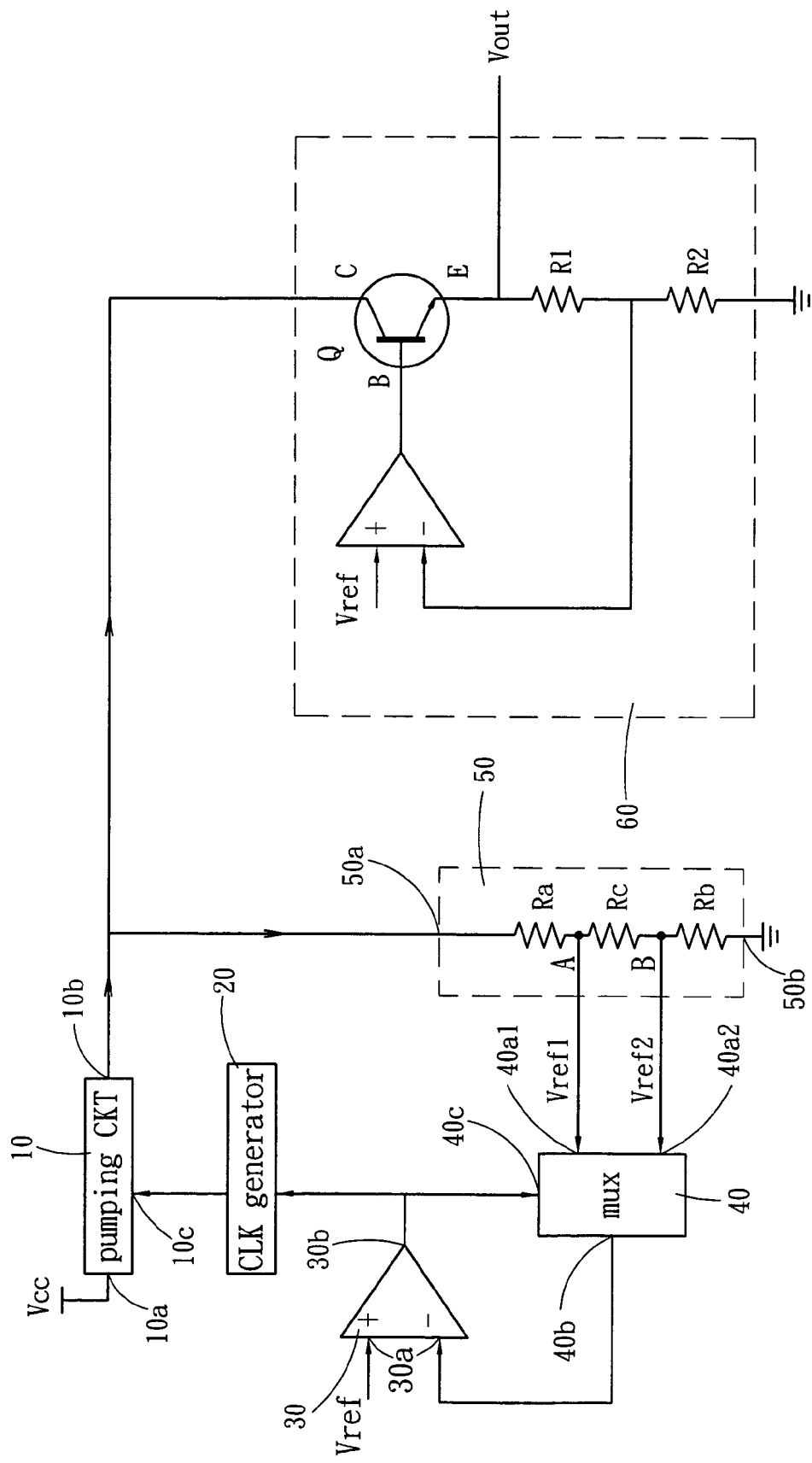
FIG. 7 is the block diagram for the second embodiment of the present invention with the regulator.

Besides, as shown in FIGS. 6 and 7, a regulator 60 can be added to the output terminal 10b of the pumping CKT 10 for the aforementioned the first and the second embodiments. The regulator 60 is composed of a comparator, a transistor Q, and resistors R1 and R2. The regulator can perform the final regulation and voltage-drop on the output voltage Vout by adjusting the magnitudes of resistors R1 and R2, which can supply more stable voltage to the load (which is not shown in the figure). The first resistor Ra, the second resistor Rb, and the third resistor Rc in the second embodiment can be made of a programmable variable-resistor that is made of semiconductor. By adjusting the third resistor Rc, the oscillation amplitude of the output voltage Vout at the output terminal 10b of the pumping CKT can be adjusted, while adjusting the first resistor Ra and the second resistor Rb the output voltage Vout at the output terminal 10b of the pumping CKT can be adjusted. Consequently, not only requirements for different loads can be satisfied but also the programmable adjusting can be achieved.

As described above, the voltage-drop is not necessary in the present invention whereas the output voltage can be multiplied to supply the load such that the unnecessary power consumption can be reduced and the output voltage can be changed by way of programming the resistance of the variable-resistor.

What is claimed is:

1. A circuit of voltage multiplier with programmable output, comprising:
   a pumping CKT, which has an input terminal, a control terminal, and an output terminal;
   a CLK generator, which connects to the control terminal of the pumping CKT and a clock signal is generated to control the operation of the pumping CKT;
   a comparator; which has two input terminals and an output terminal, the output terminal of the comparator connects to the CLK generator, and one of the input terminals of the comparator connects to a reference voltage;
   a multiplexer, which has an output terminal, a selected terminal, a the first input terminal and a second input terminal, the output terminal of the multiplexer connects to the other input terminal of the comparator, and the selected terminal of the multiplexer connects to the output terminal of the comparator;
   a voltage divider, which has an input terminal and an output terminal, wherein a first resistor, a first connection point, a third resistor, a second connection point, and a the second resistor in series between the input terminal and the output terminal of the voltage divider, the input terminal of the voltage divider connects to the output terminal of the pumping CKT, the first connection point connects to the first input terminal of the multiplexer, the second connection point connects to the second input terminal of the multiplexer, and the output terminal of the voltage divider is grounded.

2. The circuit of multiplier as claimed in claim 1, wherein the output terminal of the pumping CKT further connects a regulator.

3. The circuit of multiplier as claimed in claim 1, wherein the third resistor is a programmable variable-resistor.

4. The circuit of multiplier as claimed in claim 1, wherein the first resistor and the second resistor are programmable variable-resistors.

* * * * *